United States Patent
Yagi (10) Patent No.: US 10,179,553 B2
(45) Date of Patent: Jan. 15, 2019

(54) RESIN VEHICLE BODY GROUNDING STRUCTURE

(71) Applicant: YAZAKI CORPORATION, Tokyo (JP)

(72) Inventor: Daisuke Yagi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 183 days.

(21) Appl. No.: 15/193,230

(22) Filed: Jun. 27, 2016

(65) Prior Publication Data

US 2016/0304037 A1 Oct. 20, 2016

Related U.S. Application Data (63) Continuation of application No. PCT/JP2015/050759, filed on Jan. 14, 2015.

(30) Foreign Application Priority Data

Jan. 15, 2014 (JP) .................................. 2014-005473

(51) Int. Cl.
  *B60L 1/00* (2006.01)
  *B60L 3/00* (2006.01)
  (Continued)

(52) U.S. Cl.
  CPC ............ *B60R 16/02* (2013.01); *B60R 16/033* (2013.01); *H02J 7/14* (2013.01); *B60R 16/03* (2013.01)

(58) Field of Classification Search
  CPC ....... B60R 16/02; B60R 16/03; B60R 16/033; H02J 7/14
  (Continued)

(56) References Cited

U.S. PATENT DOCUMENTS 4,323,837 A * 4/1982 Nakamura ............ H02J 7/1476
  307/10.7
5,841,202 A * 11/1998 Noguchi ................ H04B 15/04
  307/10.1
(Continued)

FOREIGN PATENT DOCUMENTS

JP   63-46946 A    2/1988
JP   2009-6773 A   1/2009
(Continued)

OTHER PUBLICATIONS

Translation of Written Opinion issued by International Searching Authority on Mar. 31, 2015, in corresponding International Application No. PCT/JP2015/050759, which was cited in IDS filed Jun. 27, 2016. (PCT/ISA/237).
(Continued)

*Primary Examiner* — Rexford Barnie
*Assistant Examiner* — Rasem Mourad
(74) *Attorney, Agent, or Firm* — Sughrue Mion, PLLC (57) ABSTRACT

In a resin vehicle body grounding structure, a positive terminal of a battery is connected to positive terminals of a first load and a second load, a negative terminal of the battery is connected to a first grounding structure element, a negative terminal of the first load is connected to the first grounding structure element, a positive terminal of an alternator is connected to the positive terminal of the second load, the negative terminal − thereof is connected to a second grounding structure element, and the negative terminal of the second load is connected to the second grounding structure element.

4 Claims, 6 Drawing Sheets

(51) Int. Cl.
*H02G 3/00* (2006.01)
*B60R 16/02* (2006.01)
*H02J 7/14* (2006.01)
*B60R 16/033* (2006.01)
*B60R 16/03* (2006.01)

(58) Field of Classification Search
USPC .................................. 307/9.1, 10.1–10.7
See application file for complete search history.

(56) References Cited

U.S. PATENT DOCUMENTS

2010/0116565 A1* 5/2010 Jang ................. H02S 10/40
  180/2.2
2013/0106175 A1* 5/2013 Takeo ................. F02D 41/28
  307/9.1

FOREIGN PATENT DOCUMENTS

JP  2009-184611 A  8/2009
JP  2013-91456 A  5/2013

OTHER PUBLICATIONS

International Search Report, issued by International Searching Authority in corresponding International Application No. PCT/JP2015/050759, dated Mar. 31, 2015. (PCT/ISA/210).
Written Opinion, issued by International Searching Authority in corresponding International Application No. PCT/JP2015/050759, dated Mar. 31, 2015. (PCT/ISA/237).

* cited by examiner

RESIN VEHICLE BODY GROUNDING STRUCTURE

CROSS REFERENCE TO RELATED APPLICATIONS

This application is a continuation of PCT application No. PCT/JP2015/050759, which was filed on Jan. 14, 2015 based on Japanese Patent Application (No. 2014-005473) filed on Jan. 15, 2014, the contents of which are incorporated herein by reference.

BACKGROUND OF THE INVENTION

1. Field of the Invention

The present invention relates to a grounding structure in a vehicle provided with a resin body.

2. Description of the Related Art

<Synthetic Resin Vehicle Body>

For a vehicle provided with a metal vehicle body, a grounding structure is common in which the vehicle body and the negative terminal of the battery, and the vehicle body and the GND terminal of the load are connected.

On the other hand, a vehicle provided with a vehicle body integrally molded by using a synthetic resin is disclosed. For such a vehicle, as in JP-A-2009-184611 and JP-A-63-046946, vehicle grounding structures have been proposed in which the negative terminal of the battery and the load GND terminal are connected to a grounding structure element such as a metal plate as a substitute for the metal vehicle body.

<Problem>

<Occurrence of GND Fluctuation>

Figure 5A:
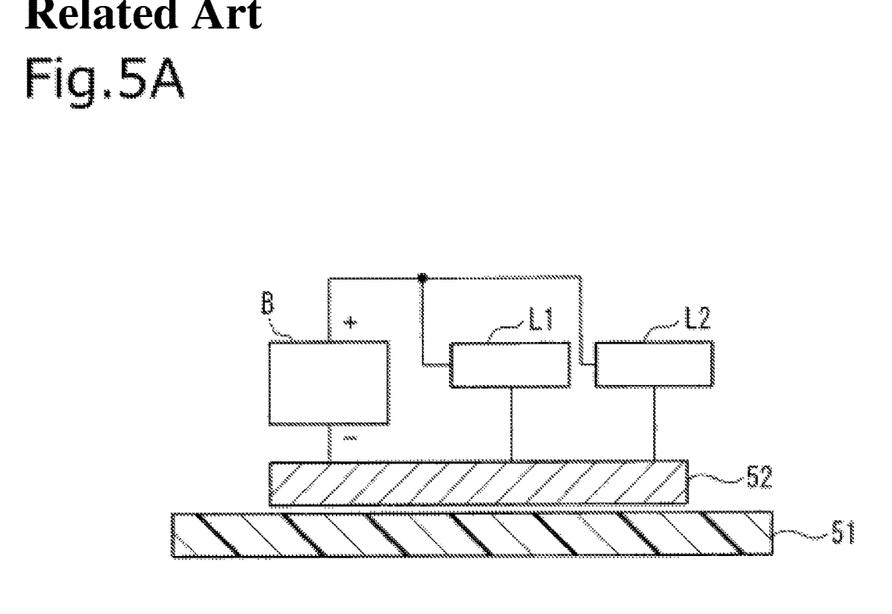
FIG. 5A is a view explaining the conventional grounding structure 1 and is a conceptual view of the conventional grounding structure 1.
Figure 5B:
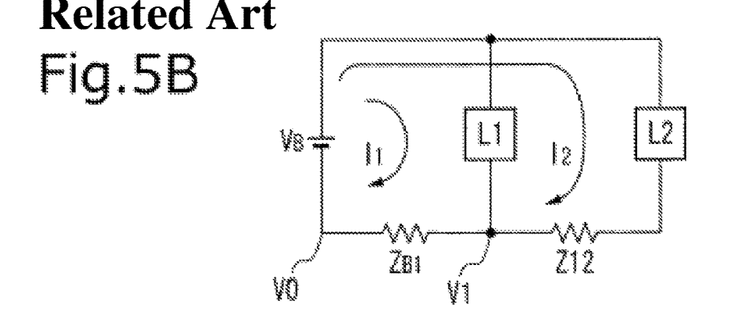
FIG. 5B is a view explaining the conventional grounding structure 1 and is an equivalent circuit of the conceptual view of FIG. 5A.

FIG. 5A and FIG. 5B are views explaining a conventional structure 1 having a grounding structure element; FIG. 5A is a conceptual view of the conventional grounding structure 1 of the grounding structure element and FIG. 5B is an equivalent circuit of the conceptual view of FIG. 5A.

In FIG. 5A, 51 represents a resin vehicle body, 52 represents a grounding structure element provided on the resin vehicle body 51, B represents a battery, L1 represents a first load, and L2 represents a second load. On the resin vehicle body 51 integrally molded by using a synthetic resin, the grounding structure element 52 is present, and on that, the battery B and the two loads (the first load L1, the second load L2) are disposed. The positive terminal + of the battery B is connected to one terminals of the first load L1 and the second load L2, the negative terminal − of the battery B is connected to the grounding structure element 52, and the other terminals of the first load L1 and the second load L2 are connected to the grounding structure element 52.

In this grounding structure, so-called "GND fluctuation" occurs where when a large current flows through either of the first load L1 and the second load L2, the GND potential increases for the other load where no large current flows.

Therefore, the reason that the "GND fluctuation" occurs will be described by using FIG. 5B which is an equivalent circuit of FIG. 5A.

<Reason that GND Fluctuation Occurs>

In FIG. 5B, VB represents a battery voltage, L1 represents the first load, L2 represents the second load, Z12 represents the impedance possessed by the grounding structure element 52 (FIG. 5A) existing between a grounding point of the first load L1 and a grounding point of the second load L2, ZB1 represents the impedance possessed by the grounding structure element 52 existing between a grounding point of the battery B and the grounding point of the first load L1, I1 represents a current flowing from the battery B through the first load L1 and the impedance ZB1, I2 is a current flowing from the battery B through the second load L2, the impedance Z12 and the impedance ZB1. Through the impedance ZB1, the currents I1 and I2 flow.

Therefore, if either of the currents I1 and I2 is a large current, the difference in potential across the impedance ZB1 increases, the potential V1 at a grounding point of the load L1 becomes higher than the potential V0 at a grounding point of the battery voltage VB, the GND potential of the load where a small current flows also becomes the high voltage V1, and here, the "GND fluctuation" occurs.

<Problem of GND Fluctuation>

When the GND fluctuation occurs, since the ground potentials of the first load L1 and the second load L2 become the high voltage V1, for the load where a small current flows, the possibility increases that a malfunction occurs and the possibility increases that electrical characteristics deviate from the rating.

Figure 6A:
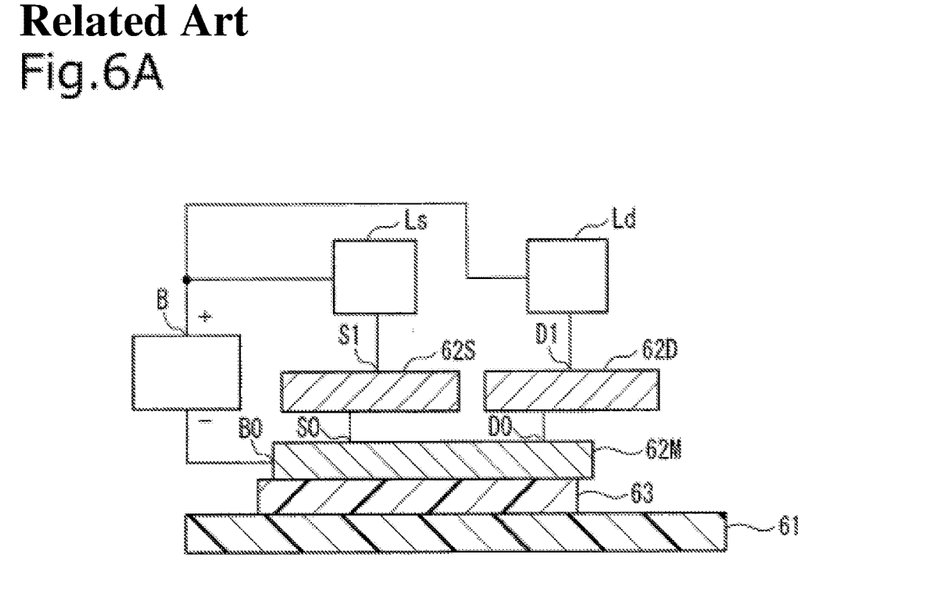
FIG. 6A is a view explaining the conventional grounding structure 2 and is a conceptual view of the conventional grounding structure 2.
Figure 6B:
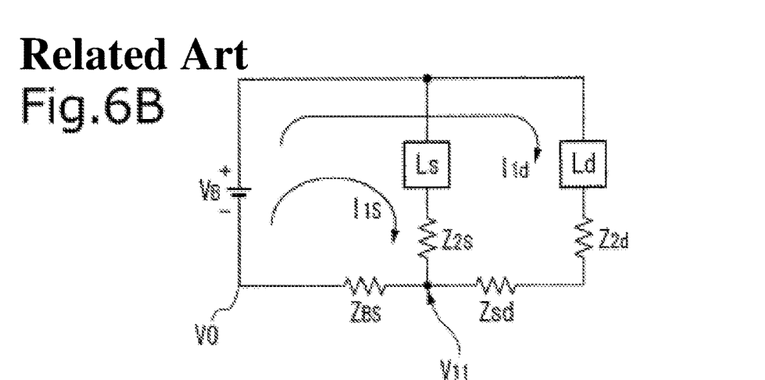
FIG. 6B is a view explaining the conventional grounding structure 2 and is an equivalent circuit of the conceptual view of FIG. 6A.

FIG. 6A and FIG. 6B are views explaining a conventional grounding structure 2 having a grounding structure element; FIG. 6A is a conceptual view of the conventional grounding structure 2 of the grounding structure element and FIG. 6B is an equivalent circuit of the conceptual view of FIG. 6A. In FIG. 6A, B represents a battery, Ls represents a signal system load, Ld represents a drive system load, 61 represents a conductive resin vehicle body, 63 represents an insulator, 62M represents a main grounding structure element provided on the insulator 63, 62S represents a signal system grounding structure element, and 62D represents a drive system grounding structure element.

The main grounding structure element 62M is provided through the insulator 63 on the conductive resin vehicle body 61 integrally molded by using a conductive synthetic resin. The battery B, the signal system grounding structure element 62S and the drive system grounding structure element 62D are provided on the main grounding structure element 62M. Further, the signal system load Ls is disposed on the signal system grounding structure element 62S, and the drive system load Ld is disposed on the drive system grounding structure element 62D.

The positive terminal + of the battery B is connected to terminals of the signal system load Ls and the drive system load Ld, the negative terminal − of the battery B is connected to the main grounding structure element 62M at a grounding point B0, the signal system grounding structure element 62S is connected to the main grounding structure element 62M at a grounding point S0, and the drive system grounding structure element 62D is connected to the main grounding structure element 62M at a grounding point D0.

Moreover, the other terminals of the signal system load Ls and the drive system load Ld are connected to the signal system grounding structure element 62S and the drive system grounding structure element 62D at grounding points S1 and D1, respectively.

In the vehicle provided with this grounding structure, the signal system grounding structure element 62S and the drive system grounding structure element 62D which are a plurality of (two in this description) grounding plates are placed on the main grounding structure element 62M connected to the negative terminal − of the battery B in the vehicle. Then, the signal system grounding structure element 62S and the drive system grounding structure element 62D, and the signal system load Ls and the drive system load Ld are connected to the positive terminal + of the battery B through electric wires. Moreover, the signal system grounding structure element 62S and the drive system grounding structure element 62D are attached to the vehicle while being insulated from the conductive resin vehicle body 61.

By thus separately disposing the signal system grounding structure element 62S and the drive system grounding structure element 62D as grounding plates, no large current from the drive system load Ld of the drive system grounding structure element 62D flows to the side of the signal system grounding structure element 62S, so that the occurrence of the GND fluctuation arising from wiring resistance can be restrained. For this reason, the potential of the grounding circuit of the signal system is stabilized, so that a grounding structure resistant to the GND fluctuation can be realized.

<Reason that GND Fluctuation Occurs>

However, a verification has found that there still is a possibility of occurrence of the GND fluctuation even with this. The reason therefor will be described with reference to FIG. 6B which is an equivalent circuit of FIG. 6A.

In FIG. 6B, VB represents a battery voltage, Ls represents the signal system load, Ld represents the drive system load, $Z2s$ represents the impedance possessed by the signal system grounding structure element 62S existing between the connection point S1 (FIG. 6A) of the signal system grounding structure element 62S on the side of the signal system load Ls and the connection point S0 (FIG. 6A) of the signal system grounding structure element 62S on the side of the main grounding structure element 62M, $Z2d$ represents the impedance possessed by the drive system grounding structure element 62D existing between the connection point D1 (FIG. 6A) of the drive system grounding structure element 62D on the side of the drive system load Ld and the connection point D0 (FIG. 6A) of the drive system grounding structure element 62D on the side of the main grounding structure element 62M, Zsd represents the impedance possessed by the main grounding structure element 62M existing between the connection point S0 (FIG. 6A) of the main grounding structure element 62M (FIG. 6A) on the side of the signal system grounding structure element 62S and the connection point D0 (FIG. 6A) on the side of the drive system grounding structure element 62D, ZBs represents the impedance possessed by the main grounding structure element 62M existing between the connection point B0 (FIG. 6A) of the main grounding structure element 62M (FIG. 6A) on the side of the battery and the connection point S0 (FIG. 6A) on the side of the signal system grounding structure element 62S, $I1s$ represents a current flowing from the battery voltage VB through the signal system load Ls, the impedance $Z2s$ and the impedance ZBs, and $I1d$ represents a current flowing from the battery voltage VB through the drive system load Ld, the impedance $Z2d$, the impedance Zsd and the impedance ZBs. The currents $I1s$ and $I1d$ flow through the impedance ZBs.

Therefore, if the current $I1d$ flowing through the drive system load Ld is a large current or a current with large fluctuation, the difference in potential across the impedance ZBs increases and the voltage V11 of the impedance ZBs on the side of the impedance Zsd becomes higher than the potential V0 at the grounding point of the battery voltage VB, so that the "GND fluctuation" where the GND potential of the signal system load Ls becomes a high voltage occurs.

If the GND fluctuation occurs, particularly, the possibility increases that a malfunction occurs on the signal system load Ls, and the possibility increases that electrical characteristics deviate from the rating.

SUMMARY OF THE INVENTION

The present invention is made in view of the above-mentioned circumstances, and an object thereof is to provide a vehicle grounding structure in which the GND fluctuation is reduced as much as possible, a malfunction hardly occurs and the deviation of electrical characteristics from the rating is prevented.

To attain the above-mentioned object, the resin vehicle body grounding structure of the invention of the present application is characterized by the following (1) to (4):

(1) A resin vehicle body grounding structure comprising:
a resin vehicle body;
at least one first grounding structure element and at least one second grounding structure element provided on the resin vehicle body;
a battery and at least one first load; and
an alternator and at least one second load,
wherein a positive terminal of the battery is connected to positive terminals of the first load and the second load and a negative terminal of the battery is connected to the first grounding structure element, a negative terminal of the first load is connected to the first grounding structure element, a positive terminal of the alternator is connected to the positive terminal of the second load and a negative terminal of the alternator is connected to the second grounding structure element, a negative terminal of the second load is connected to the second grounding structure element, and the first grounding structure element and the second grounding structure element are connected to each other.

(2) A resin vehicle body grounding structure comprising:
a resin vehicle body;
at least one main grounding structure element provided on the resin vehicle body; and
a battery and an alternator, and at least one first grounding structure element and at least one second grounding structure element,
wherein a positive terminal of the battery is connected to positive terminals of at least one first load and at least one second load and a negative terminal of the battery is connected to the first grounding structure element, a negative terminal of the at least one first load is connected to the first grounding structure element, a positive terminal of the alternator is connected to positive terminals of the at least one first load and the at least one second load and a negative terminal of the alternator is connected to the second grounding structure element, a negative terminal of the at least one second load is connected to the second grounding structure element, and the first grounding structure element and the second grounding structure element are both connected to the main grounding structure element.

(3) The resin vehicle body grounding structure in the above (1) or (2), wherein a power source that supplies power together with the battery or on behalf of the battery during traveling or during engine operation is used instead of the alternator.

(4) The resin vehicle body grounding structure in any one of the above (1) to (3), wherein the battery and the alternator are interchanged.

According to the invention of the above (1) to (4), since the current flowing through the drive system load (second load) does not pass through the grounding structure element existing between the negative terminal of the battery and the negative terminal of the signal system grounding structure element, a voltage drop does not occur which is caused by the current flowing through the impedance possessed by the signal system grounding structure element and consequently, the fluctuation of the grounding GND potential of the signal system load is reduced.

Consequently, if the GND fluctuation is reduced, the possibility decreases that a malfunction occurs on the drive system load, so that the deviation of electrical characteristics from the rating is prevented.

DETAILED DESCRIPTION OF THE EXEMPLARY EMBODIMENTS

While the battery and the alternator are treated collectively as one power source in the background art, the present invention is made with attention focused on the fact that during engine operation, an alternator voltage occurs and power is mainly supplied from this alternator. The present invention reduces the fluctuation of the grounding GND potential of the signal system load by preventing a large current from passing through the grounding point of the signal system load by returning the large current from the alternator to the negative terminal of the alternator by way of the drive system load Ld and the drive system grounding structure element during engine operation.

Hereinafter, resin vehicle body grounding structures of first and second embodiments according to the present invention will be described using FIG. 1 to FIG. 4B.

First Embodiment

Figure 1:
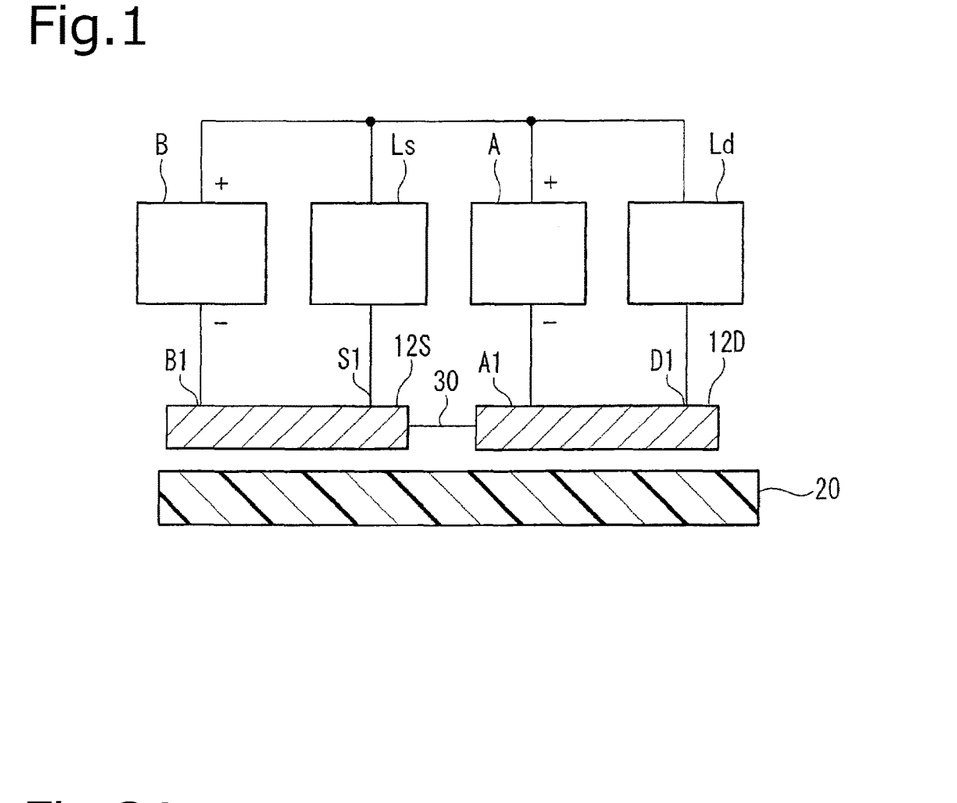
FIG. 1 is a conceptual view explaining a grounding structure according to a first embodiment of the present invention.
Figure 2A:
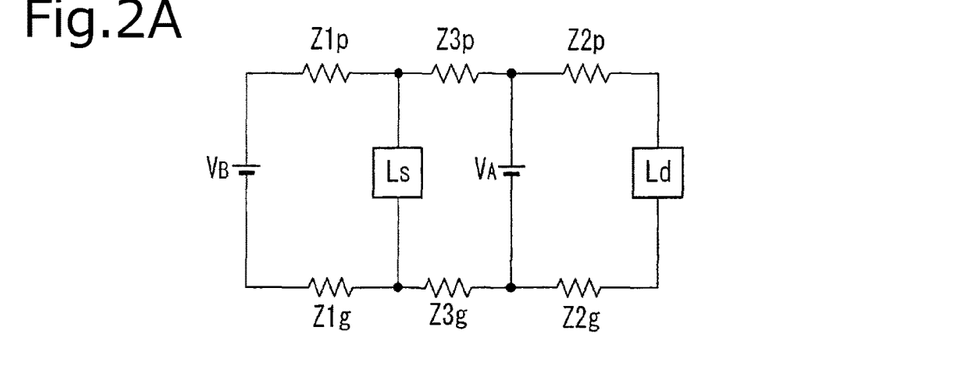
FIG. 2A is an equivalent circuit of the conceptual view of the grounding structure of FIG. 1.
Figure 2B:
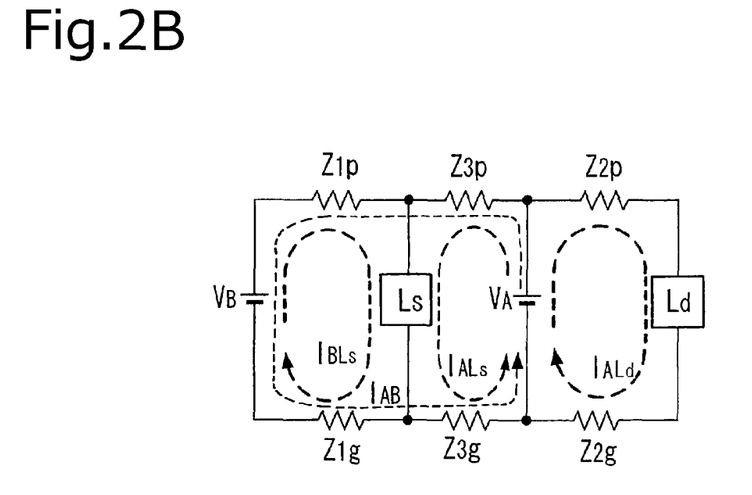
FIG. 2B is a circuit diagram showing the current flow during traveling with VB<VA in the equivalent circuit of FIG. 2A.

FIG. 1 is a view explaining the grounding structure according to the first embodiment of the present invention, FIG. 2A is an equivalent circuit of the conceptual view of FIG. 1, and FIG. 2B is a circuit diagram showing the current flow during traveling with VB<VA in the equivalent circuit of FIG. 2A.

In FIG. 1, A represents an alternator, B represents a battery, Ls represents a signal system load, Ld represents a drive system load, 20 represents a resin vehicle body, 12S represents a signal system grounding structure element provided on the resin vehicle body 20, and 12D represents a drive system grounding structure element also provided on the resin vehicle body 20. As mentioned above, the signal system grounding structure element 12S and the drive system grounding structure element 12D are independently provided on the resin vehicle body 20, and further, the battery B and the signal system load Ls are disposed on the signal system grounding structure element 12S and the alternator A and the drive system load Ld are disposed on the drive system grounding structure element 12D.

The drive system load Ld is a load containing current fluctuation and noise components for a large current, that is, electrical equipment of the power system, for example, equipment such as a blower motor of an air conditioner, a wiper motor and a head lamp. The signal system load Ls is a low current load, that is, electrical equipment having a grounding circuit of the signal system, specifically, a radio, various kinds of electronic control devices and the like.

The positive terminal + of the battery B is connected to the signal system load Ls and the positive terminal + of the alternator A, the negative terminal − of the battery B is connected to the signal system grounding structure element 12S at a grounding point B1, and the negative terminal of the signal system load Ls is connected to the signal system grounding structure element 12S at a grounding point S1.

Moreover, the positive terminal + of the alternator A is connected to the positive terminal of the drive system load Ld, the negative terminal − of the alternator A is connected to the drive system grounding structure element 12D at a grounding point A1, and the negative terminal of the drive system load Ld is connected to the drive system grounding structure element 12D at a grounding point D1.

The signal system grounding structure element 12S and the drive system grounding structure element 12D are electrically connected together through a ground wire 30.

As described above, the first embodiment is characterized in that the battery B and the signal system load Ls are placed on the signal system grounding structure element 12S and the alternator A and the drive system load Ld are placed on the drive system grounding structure element 12D.

<Reason that GND Fluctuation Doe not Occur>

In FIG. 2A and FIG. 2B which are an equivalent circuit of FIG. 1, VB represents a battery voltage, VA represents an alternator voltage, Ls represents the signal system load, and Ld represents the drive system load.

$Z1g$ represents the impedance possessed by the signal system grounding structure element 12S existing between the contact point S1 (FIG. 1) of the signal system grounding structure element 12S (FIG. 1) on the side of the signal system load Ls and the contact point B1 (FIG. 1) on the side of the battery B, $Z2g$ represents the impedance possessed by the drive system grounding structure element 12D existing between the contact point D1 (FIG. 1) of the drive system grounding structure element 12D (FIG. 1) on the side of the drive system load Ld and the contact point A1 (FIG. 1) on the side of the alternator voltage VA, and $Z3g$ represents the impedance from the contact point S1 of the signal system grounding structure element 12S on the side of the signal system load Ls to the contact point D1 of the drive system grounding structure element 12D on the side of the drive system load Ld.

IALd represents a current flowing through the drive system load Ld and the impedance $Z2g$ with the alternator A as the power source, IBLs represents a current flowing through the signal system load Ls and the impedance $Z1g$ with the battery B as the power source, IAB represents a current flowing through the battery B and $Z1g$ with the alternator A as the power source, and IALs represents a current flowing through the signal system load Ls with the alternator A as the power source.

Since it is typical that the voltage VA occurring at the alternator A is slightly (approximately 1 to 3 V) higher than the battery voltage VB during traveling or during engine operation, when the voltage drop of the alternator voltage due to Z3p and Z3g is small and the voltage VALs across the signal system load Ls with the alternator A as the power source is higher than the voltage VBLs across the signal system load Ls with the battery B as the power source, the current IBLs flowing through the signal system load Ls with the battery B as the power source hardly flows, and the current IALs supplied from the alternator A flows to the signal system load Ls. Here, since the large current IALs flowing through the drive system load Ld does not flow through the impedance Z1g or the impedance Z3g affecting the GND potential of the signal system load Ls, there is no room for the occurrence of a voltage drop due to the flow of a large current through the impedance possessed by the signal system grounding structure element as in the background art, and consequently, the fluctuation of the grounding GND potential of the signal system load Ls is reduced.

Moreover, when the voltage drop of the alternator voltage due to Z3p and Z3g is large and the voltage VALs across the signal system load Ls with the alternator A as the power source is lower than the voltage VBLs across the signal system load Ls with the battery B as the power source, the current IALs flowing through the signal system load Ls with the alternator A as the power source hardly flows, and the current IBLs supplied from the battery B flows to the signal system load Ls. Since the large current IALs flowing through the drive system load Ld does not flow through the impedance Z1g and the impedance Z3g affecting the GND potential of the signal system load Ls also in this case, there is no room for the occurrence of a voltage drop due to the flow of a large current through the impedance possessed by the signal system grounding structure element as in the background art, and consequently, the fluctuation of the grounding GND potential of the signal system load Ls is reduced.

Further, for example, the battery B serves as a large-capacitance capacitor also when current fluctuation occurs on the current IALs flowing through the drive system load Ld, so that the effect of reducing the GND fluctuation is also expected.

If the GND fluctuation is reduced, the rise and fluctuation of the GND potential of the signal system load Ls decrease, so that a malfunction of the load and the deviation of electrical characteristics from the rating can be avoided.

Second Embodiment

Figure 3:
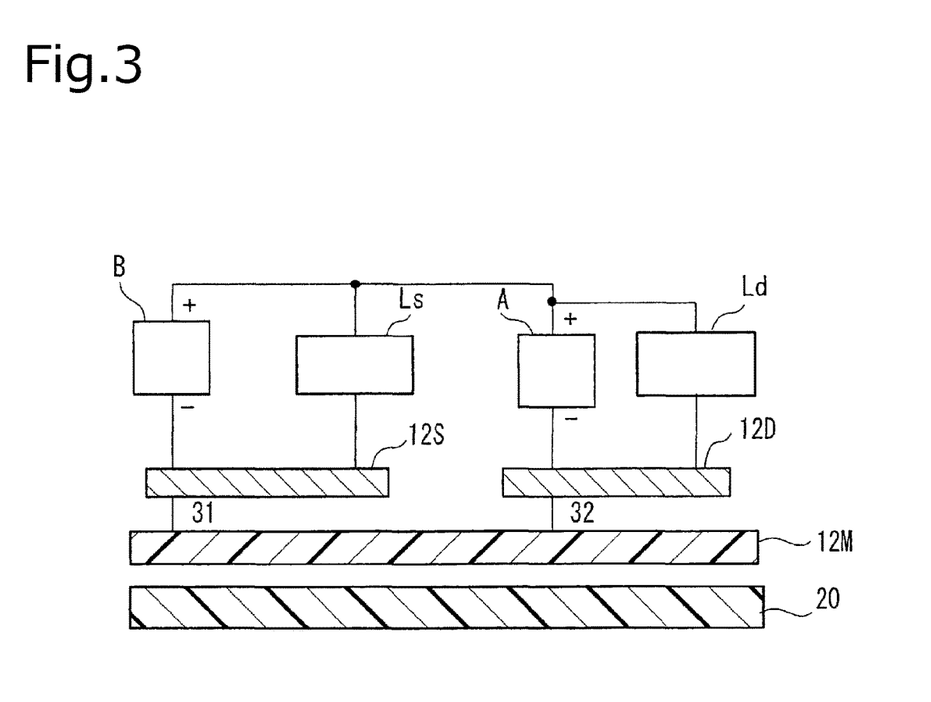
FIG. 3 is a view explaining a grounding structure according to a second embodiment of the present invention.
Figure 4A:
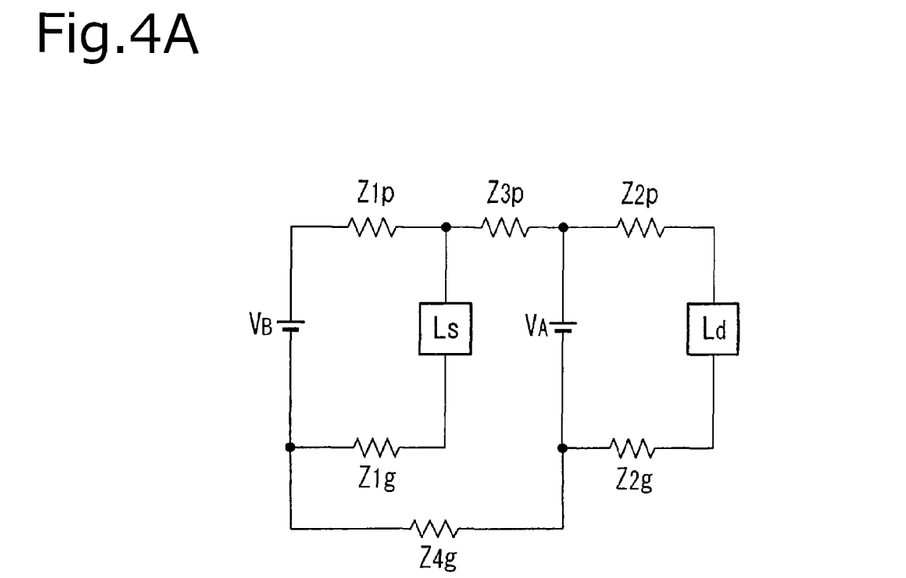
FIG. 4A is an equivalent circuit of the conceptual view of the grounding structure of FIG. 3.
Figure 4B:
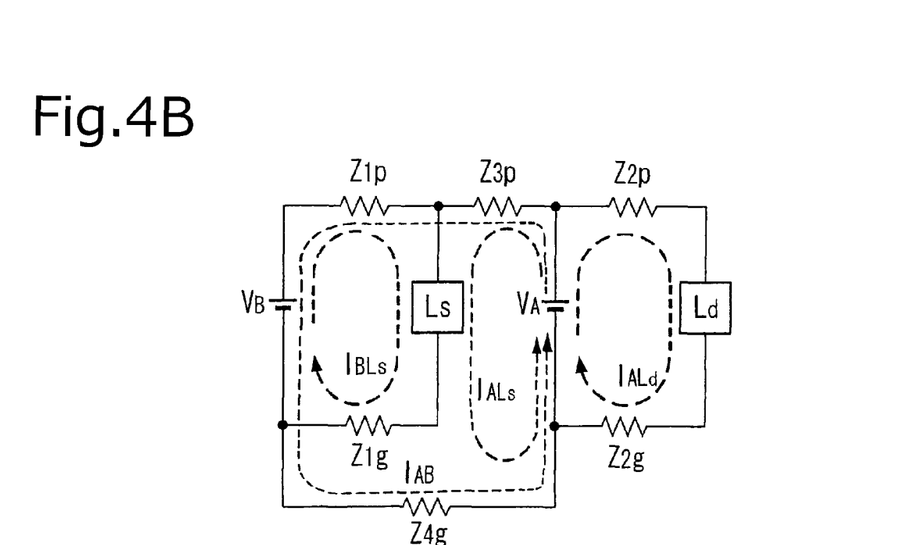
FIG. 4B is a circuit diagram showing the current flow during traveling with VB<VA in the equivalent circuit of FIG. 4A.

FIG. 3 is a view explaining a grounding structure according to a second embodiment of the present invention, FIG. 4A is an equivalent circuit of the conceptual view of FIG. 3, and FIG. 4B is a circuit diagram showing the current flow during engine operation or during traveling with VB<VA in the equivalent circuit of FIG. 4A.

In FIG. 3, A represents the alternator, B represents the battery, Ls represents the signal system load, Ld represents the drive system load, 20 represents the resin vehicle body, 12M represents a main grounding structure element provided on the resin vehicle body 20, 12S represents the signal system grounding structure element, and 12D represents the drive system grounding structure element.

The main grounding structure element 12M, and the signal system grounding structure element 12S and the drive system grounding structure element 12D are provided on the resin vehicle body 20, and further, the signal system load Ls and the drive system load Ld are disposed thereon.

The alternator A is disposed on the drive system grounding structure element 12D together with the drive system load Ld, the positive terminal + of the alternator A is connected to the positive terminal of the drive system load Ld, and the negative terminal − of the alternator A is connected to the drive system grounding structure element 12D.

The battery B is disposed on the signal system grounding structure element 12S together with the signal system load Ls, the positive terminal + of the battery B is connected to the positive terminal of the signal system load Ls and the positive terminal + of the alternator A, and the negative terminal − of the battery B is connected to the signal system grounding structure element 12S.

The second embodiment is different from the first embodiment in that the main grounding structure element 12M is provided in addition to the signal system grounding structure element 12S and the drive system grounding structure element 12D.

In FIG. 4A and FIG. 4B which are an equivalent circuit of FIG. 3, VB represents the battery voltage, VA represents the alternator voltage, Ls represents the signal system load, and Ld represents the drive system load.

Z1g represents the impedance possessed by the signal system grounding structure element between the signal system load side and the battery side, Z2g represents the impedance possessed by the drive system grounding structure element between the drive system load side and the alternator side, and Z4g represents the impedance possessed by the main grounding structure element 12M between a ground wire 31 on the side of the signal system grounding structure element 12S and a ground wire 32 on the side of the drive system grounding structure element 12D.

IALd represents the current flowing through the drive system load Ld and the impedance Z2g with the alternator A as the power source, IBLs represents the current flowing through the signal system load Ls and the impedance Z1g with the battery B as the power source, IAB represents the current flowing through the impedance Z4g via the battery B with the alternator A as the power source, and IALs represents the current flowing through the signal system load Ls, the impedance Z1g and the impedance Z4g with the alternator A as the power source.

Since it is typical that the voltage VA occurring at the alternator A is slightly (approximately 1 to 3 V) higher than the battery voltage VB during engine operation or during traveling, when the voltage drop of the alternator voltage due to Z3p and Z4g is small and the voltage VALs across the signal system load Ls with the alternator A as the power source is higher than the voltage VBLs across the signal system load Ls with the battery B as the power source, the current IBLs flowing through the signal system load Ls with the battery B as the power source hardly flows, and the current IALs supplied from the alternator A flows to the signal system load Ls. Here, since the large current IALs flowing through the drive system load does not flow through the impedance Z1g or the impedance Z4g affecting the GND potential of the signal system load Ls, there is no room for the occurrence of a voltage drop due to the flow of a large current through the impedance possessed by the signal system grounding structure element as in the background art, and consequently, the fluctuation of the grounding GND potential of the signal system load Ls is reduced.

Moreover, when the voltage drop of the alternator voltage due to Z3p and Z4g is large and the voltage VALs across the signal system load Ls with the alternator A as the power source is lower than the voltage VBLs across the signal system load Ls with the battery B as the power source, the current IALs flowing through the signal system load Ls with the alternator A as the power source hardly flows, and the current IBLs supplied from the battery B flows to the signal system load Ls.

Since the large current IALs flowing through the drive system load Ld does not flow through the impedance Z1g and the impedance Z4g affecting the GND potential of the signal system load Ls also in this case, there is no room for the occurrence of a voltage drop due to the flow of a large current through the impedance possessed by the signal system grounding structure element as in the background art, and consequently, the fluctuation of the grounding GND potential of the signal system load Ls is reduced.

Further, for example, the battery B serves as a large-capacitance capacitor also when current fluctuation occurs on the current IALs flowing through the drive system load Ld, so that the effect of reducing the GND fluctuation is also expected.

If the GND fluctuation is reduced, the rise and fluctuation of the GND potential of the signal system load Ls decrease, so that a malfunction of the load and the deviation of electrical characteristics from the rating can be prevented.

<First Application>

While description is given with the alternator as an example in the above-described first and second embodiments, the present invention is not limited to the alternator; as long as the power source is such as to supply power together with the battery or on behalf of the battery during engine operation or during traveling, for example, a grounding structure may be such that an inverter or the like replaces the alternator.

<Second Application>

While the battery and the first load of the signal system are placed on the same grounding structure element and the alternator and the second load of the drive system are placed on the same grounding structure element in the above-described first and second embodiments, the structure may be such that the battery and the alternator are interchanged.

SUMMARY

According to the present invention, the alternator voltage VA occurring during engine operation or during traveling causes the large current IALd to flow to the side of the negative terminal of the alternator by way of the drive system load Ld, thereby reducing the rise and fluctuation of the GND voltage of the signal system load Ls. If the fluctuation of the GND potential is reduced, a malfunction of the signal system load Ls and the deviation of electrical characteristics from the rating are prevented.

Now, features of the above-described embodiments of the resin vehicle body grounding structure according to the present invention are briefly summarized and listed in the following [1] to [4]:

[1] A resin vehicle body grounding structure comprising:
a resin vehicle body (20);
at least one first grounding structure element (12S) and at least one second grounding structure element (12D) provided on the resin vehicle body;
a battery (B) and at least one first load (Ls); and
an alternator (A) and at least one second load (Ld),
wherein a positive terminal of the battery is connected to positive terminals of the first load and the second load and a negative terminal of the battery is connected to the first grounding structure element, a negative terminal of the first load is connected to the first grounding structure element, a positive terminal of the alternator is connected to the positive terminal of the second load and a negative terminal of the alternator is connected to the second grounding structure element, a negative terminal of the second load is connected to the second grounding structure element, and the first grounding structure element and the second grounding structure element are connected to each other.

[2] A resin vehicle body grounding structure comprising:
a resin vehicle body (20);
at least one main grounding structure element (12S) provided on the resin vehicle body; and
a battery (B) and an alternator (A), and at least one first grounding structure element (12S) and at least one second grounding structure element (12D),
wherein a positive terminal of the battery is connected to positive terminals of at least one first load (Ls) and at least one second load (Ld) and a negative terminal of the battery is connected to the first grounding structure element, a negative terminal of the at least one first load is connected to the first grounding structure element, a positive terminal of the alternator is connected to positive terminals of the at least one first load and the at least one second load and a negative terminal of the alternator is connected to the second grounding structure element, a negative terminal of the at least one second load is connected to the second grounding structure element, and the first grounding structure element and the second grounding structure element are both connected to the main grounding structure element.

[3] The resin vehicle body grounding structure according to the above (1) or (2), wherein a power source that supplies power together with the battery or on behalf of the battery during traveling or during engine operation is used instead of the alternator.

[4] The resin vehicle body grounding structure according to any one of the above [1] to [3], wherein the battery and the alternator are interchanged.

While the present invention has been described in detail and with reference to specific embodiments, it is obvious to one of ordinary skill in the art that various changes and modifications may be added without departing from the spirit and scope of the present invention.

INDUSTRIAL APPLICABILITY

With the present invention, the possibility decreases that a malfunction occurs on the drive system load, so that the deviation of electrical characteristics from the rating is prevented. The present invention producing this advantage is useful for the grounding structure in a vehicle provided with a resin vehicle body.

What is claimed is:

1. A resin vehicle body grounding structure to reduce ground fluctuations, comprising:
a resin vehicle body;
at least one first grounding structure element and at least one second grounding structure element provided on the resin vehicle body;
a battery and a first load; and
an alternator and a second load,
wherein a positive terminal of the battery is connected to a positive terminal of the first load and a positive terminal of the second load, a negative terminal of the battery is connected to the first grounding structure element, a negative terminal of the first load is connected to the first grounding structure element, a positive terminal of the alternator is connected to the positive terminal of the second load and a negative terminal of the alternator is connected to the second grounding structure element, a negative terminal of the second load is connected to the second grounding structure element, and the first grounding structure element and the second grounding structure element are connected to each other, such that:

a first electric pathway is defined to be from the positive terminal of the battery, to the first load, to the first grounding structure element, and then to the negative terminal of the battery, a second electric pathway is defined to be from the positive terminal of the alternator, to the second load, to the second grounding structure element, and then to the negative terminal of the alternator, and the first electric pathway and the second electric pathway do not overlap.

2. The resin vehicle body grounding structure according to claim 1, wherein the battery and the alternator are interchanged.

3. The resin vehicle body grounding structure according to claim 1, wherein a connection pathway is defined from the positive terminal of the battery to the positive terminal of the second load, and the positive terminal of the first load is connected to the connection pathway between where the battery and the second load are connected to the connection pathway, and the positive terminal of the alternator is connected to the connection pathway between where the first load and the second load are connected to the connection pathway.

4. The resin vehicle body grounding structure according to claim 1, wherein a voltage occurring at the alternator is higher than a voltage occurring at the battery so that a current flowing from the alternator to the second load and then to the second grounding structure element does not flow into the first grounding structure element.

* * * * *